United States Patent
Bendtson

(10) Patent No.: US 11,575,837 B2
(45) Date of Patent: Feb. 7, 2023

(54) METHOD, APPARATUS AND COMPUTER PROGRAM FOR GENERATING AND DISPLAYING A HEATMAP BASED ON VIDEO SURVEILLANCE DATA

(71) Applicant: CANON KABUSHIKI KAISHA, Tokyo (JP)

(72) Inventor: Jimmi Bendtson, Roskilde (DK)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/230,406

(22) Filed: Apr. 14, 2021

(65) Prior Publication Data
US 2021/0337133 A1 Oct. 28, 2021

(30) Foreign Application Priority Data

Apr. 27, 2020 (GB) .................................. 2006137
Apr. 27, 2020 (GB) .................................. 2006147

(51) Int. Cl.
| | | |
|---|---|---|
| H04N 5/232 | (2006.01) | |
| H04N 5/265 | (2006.01) | |
| G06T 11/00 | (2006.01) | |
| H04N 7/18 | (2006.01) | |

(52) U.S. Cl.
CPC ..... *H04N 5/232939* (2018.08); *G06T 11/001* (2013.01); *H04N 5/265* (2013.01); *H04N 7/183* (2013.01)

(58) Field of Classification Search
CPC .. H04N 5/232939; H04N 5/265; H04N 7/183; G06T 11/001
See application file for complete search history.

(56) References Cited

U.S. PATENT DOCUMENTS

| | | | |
|---|---|---|---|
| 6,429,868 B1* | 8/2002 | Dehner, Jr. ........... | G06T 11/206 345/440 |
| 8,831,281 B2* | 9/2014 | Shellshear ............... | G06T 7/20 382/103 |
| 9,406,342 B2* | 8/2016 | Lim ....................... | G11B 27/34 |
| 9,981,399 B2* | 5/2018 | Foster .................... | B26D 5/00 |
| 10,116,910 B2* | 10/2018 | Lim ...................... | H04N 5/765 |
| 10,181,208 B2* | 1/2019 | Witriol .................. | G06T 11/206 |
| 10,380,447 B1* | 8/2019 | Kulewski .............. | G06V 10/50 |
| 10,540,546 B2* | 1/2020 | Kusakabe ............. | G06T 7/0002 |
| 10,643,667 B2* | 5/2020 | Chau ..................... | G06V 20/46 |
| 10,719,650 B1* | 7/2020 | Sanders ................. | G06F 30/39 |
| 10,872,262 B2* | 12/2020 | Yano ...................... | G06T 7/11 |
| 10,949,713 B2* | 3/2021 | Kawabayashi ........ | G06V 40/10 |
| 10,950,003 B2* | 3/2021 | Campbell ........... | H04N 5/23222 |
| 11,128,848 B2* | 9/2021 | Kubo .................... | H04N 9/315 |
| 11,157,747 B2* | 10/2021 | Tsunematsu ........... | G06T 11/00 |

(Continued)

*Primary Examiner* — Brian P Yenke
(74) *Attorney, Agent, or Firm* — Canon U.S.A., Inc. IP Division

(57) ABSTRACT

A computer implemented method for displaying data in the form of a heatmap comprises generating and displaying a first heatmap based on a first dataset of video surveillance data, receiving a user input selecting an area of the first heatmap, generating and displaying a second heatmap based on a second dataset of video surveillance data, wherein the second dataset is a subset of the first dataset which is limited only based on the area selected by the user, and wherein the step of generating and displaying the second heatmap comprises recalibrating a colour range based on the second dataset.

19 Claims, 9 Drawing Sheets

(56) References Cited

U.S. PATENT DOCUMENTS

| | | | |
|---|---|---|---|
| 11,210,531 B2* | 12/2021 | Sato | G06V 20/53 |
| 11,455,089 B1* | 9/2022 | Aron | G06F 3/04842 |
| 2008/0117333 A1* | 5/2008 | Walsh | H04N 5/2723 |
| | | | 348/586 |
| 2009/0134968 A1 | 5/2009 | Girgensohn et al. | |
| 2010/0165112 A1* | 7/2010 | Scanlon | G06V 20/52 |
| | | | 348/208.4 |
| 2012/0008003 A1* | 1/2012 | Lim | G09G 5/14 |
| | | | 348/222.1 |
| 2012/0062732 A1* | 3/2012 | Marman | G08B 13/19682 |
| | | | 348/142 |
| 2012/0173577 A1* | 7/2012 | Millar | G06F 16/7837 |
| | | | 707/E17.014 |
| 2013/0083232 A1* | 4/2013 | Tay | H04N 5/232945 |
| | | | 348/357 |
| 2013/0091432 A1 | 4/2013 | Shet et al. | |
| 2013/0208124 A1* | 8/2013 | Boghossian | G08B 13/19645 |
| | | | 382/103 |
| 2014/0232743 A1* | 8/2014 | Na | H04N 5/2621 |
| | | | 345/629 |
| 2015/0170616 A1* | 6/2015 | Corpet | G01C 21/3679 |
| | | | 345/629 |
| 2015/0381946 A1* | 12/2015 | Renkis | G08B 13/19663 |
| | | | 348/47 |
| 2016/0021333 A1 | 1/2016 | Lim et al. | |
| 2017/0228899 A1* | 8/2017 | Witriol | G06T 11/001 |
| 2017/0352380 A1* | 12/2017 | Doumbouya | G11B 27/22 |
| 2019/0147657 A1* | 5/2019 | Kumar | G06F 3/011 |
| | | | 345/419 |
| 2020/0116494 A1* | 4/2020 | Yu | A63F 13/216 |
| 2020/0151441 A1* | 5/2020 | Doumbouya | G06V 10/75 |
| 2020/0296332 A1* | 9/2020 | Heier | H04N 7/185 |
| 2020/0374491 A1* | 11/2020 | DeAngelus | G06V 10/22 |
| 2021/0073709 A1* | 3/2021 | Shaw | G06T 11/001 |
| 2022/0051020 A1* | 2/2022 | Jha | G06T 11/20 |

* cited by examiner

METHOD, APPARATUS AND COMPUTER PROGRAM FOR GENERATING AND DISPLAYING A HEATMAP BASED ON VIDEO SURVEILLANCE DATA

CROSS-REFERENCE TO RELATED APPLICATIONS

This application claims the benefit under 35 U.S.C. § 119(a)-(d) of United Kingdom Patent Application No. 2006147.9, filed on Apr. 27, 2020 and titled "A METHOD, APPARATUS AND COMPUTER PROGRAM FOR GENERATING AND DISPLAYING A HEATMAP BASED ON VIDEO SURVEILLANCE DATA", and United Kingdom Patent Application No. 2006137.0, filed on Apr. 27, 2020 and titled "A METHOD, APPARATUS AND COMPUTER PROGRAM FOR GENERATING AND DISPLAYING A HEATMAP BASED ON VIDEO SURVEILLANCE DATA". The above cited patent applications are incorporated herein by reference in their entirety.

BACKGROUND

The present disclosure relates to a computer implemented method and apparatus for generating and displaying a heatmap based on video surveillance data.

Heatmaps are a useful tool for analysing video surveillance data over time. A heatmap representing video data can be displayed overlaid onto an image from a video camera, and will use a colour scale to represent certain objects or activity detected in the video data from that camera over a specified period of time. One example might be simple motion detection. In this case, the heatmap will display coloured areas where motion has been detected in the image during the specified time period and a colour scale is used to indicate the cumulative amount of motion detected over the time period. Typically the colour scale will be a spectrum with red indicating the maximum amount and blue or violet indicating the minimum amount, wherein the maximum and minimum amounts are set based on the data that is to be displayed. However, other colour schemes may be used, including shades of grey or shades of another single colour. The user can set the specified period of time. For example, the user can select to display a heatmap of motion detected in the last hour, or the last 24 hours, or the last week, depending on the user's requirements.

Many video analytics software modules are available which can analyse video surveillance data and detect specific objects or activity. These will typically attach metadata to the video stream indicating a time and position in the frame where the objects or activity have been detected. Therefore, a heatmap can be displayed based on the metadata indicating object or activity detection. For example, a video stream from a camera showing a road junction can be limited to show a heatmap based on detection of cars only, or trucks, or bicycles. Or a video stream from a camera in a shopping mall could be used to generate a heatmap of people, or dogs. Some object recognition algorithms are sophisticated enough to categorised people by age and gender, so it would be possible to generate a heatmap showing only males of a certain age.

Alternatively, a heatmap can also be displayed on a map or plan view of an area, in which case the data used to generate the heatmap might come from multiple cameras.

SUMMARY

According to a first aspect the present disclosure there is provided a computer implemented method for displaying data in the form of a heatmap according to claim 1.

The first aspect of the present disclosure also provides an apparatus according to claim 12.

Often a heatmap is not very useful if non-interesting areas of the heatmap contains values that are much higher (or much lower) than the interesting areas. In these cases, the colour scale used is calibrated from the highest value in the data to the lowest value. This has the effect that the portions of the heatmap in the interesting areas are suppressed and have a low level of detail, because they only use a reduced part of the colour range. Thus, according to the present disclosure, an area of interest can be selected, either by selecting areas of interest for inclusion or by selecting areas not of interest for exclusion, and the colour scale of the heatmap is then recalibrated based on only the data in the area of interest i.e. using the lowest and highest values in the reduced dataset. This can remove extreme "outliers" from the data and allow the remaining data to be more clearly displayed to a user.

According to a second aspect of the present disclosure there is provided a computer implemented method for displaying data in the form of a heatmap comprising:
  generating and displaying a heatmap based on video surveillance data;
  receiving a user selection of a search area on the heatmap;
  extracting image data from the video surveillance data corresponding to objects or activity represented by the heatmap within the search area; and
  displaying the extracted image data.

The second aspect of the present disclosure also provides an apparatus for displaying data in the form of a heatmap comprising:
  a display; and
  a processor configured to:
  generate a heatmap based on video surveillance data and cause the heatmap to be displayed on the display;
  receive a user selection of a search area on the heatmap;
  generate a search query to extract image data from the video surveillance data corresponding to objects or activity represented by the heatmap within the search area and send the search query to a recording server; and
  receive search results including extracted image data from the recording server; and
  cause the extracted image data to be displayed on the display.

The second aspect of the present disclosure allows a user to use a heatmap display to hone in on particular areas of interest and extract image data from the video surveillance data to further investigate.

BRIEF DESCRIPTION OF THE DRAWINGS

Embodiments of the present disclosure will now be described, by way of example only, with reference to the accompanying drawings in which.

DETAILED DESCRIPTION

Figure 6:
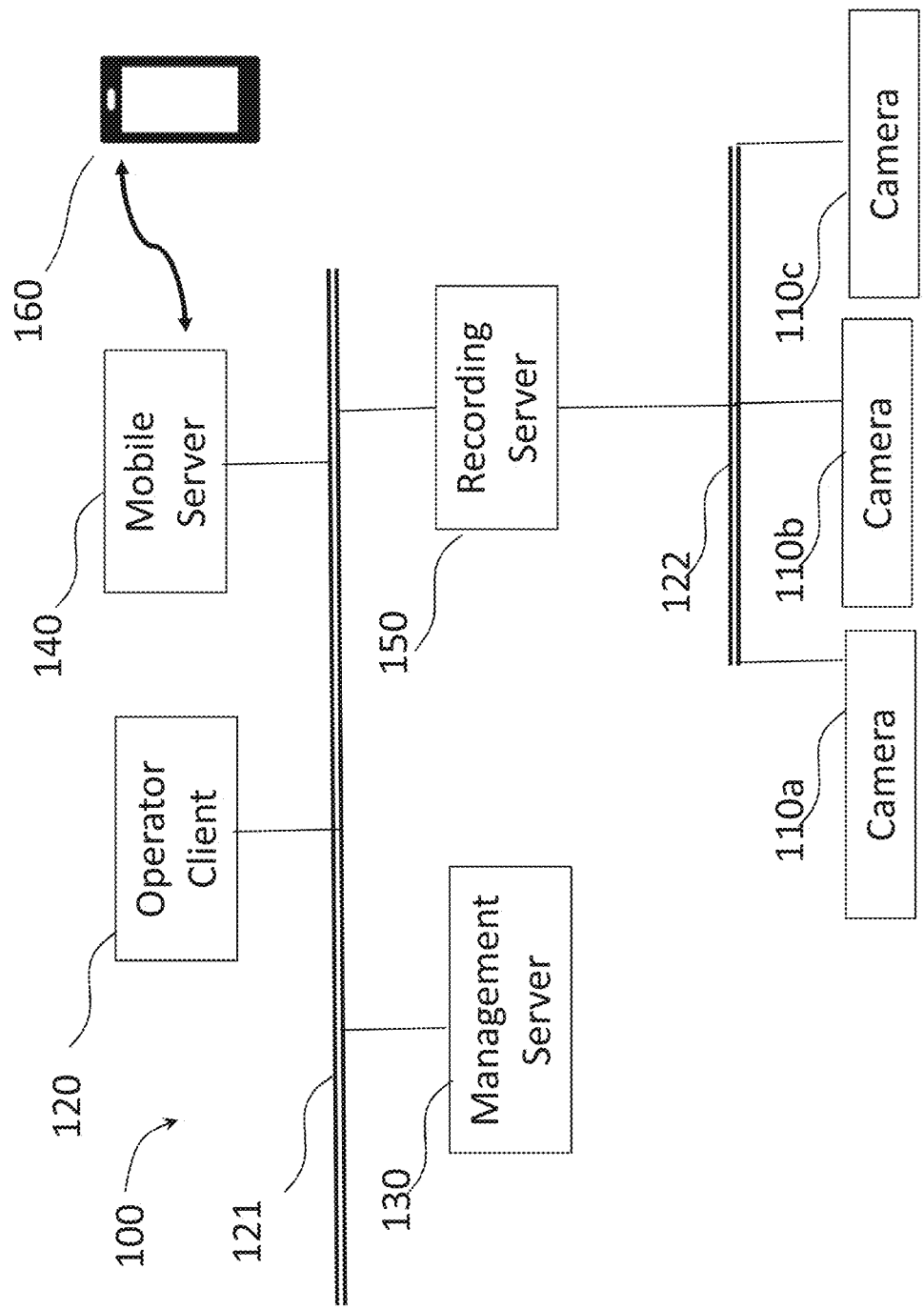
FIG. 6 illustrates an example of a video surveillance system in which the present disclosure can be implemented.

FIG. 6 shows an example of a video surveillance system 100 in which embodiments of the present disclosure can be implemented. The system 100 comprises a management server 130, a recording server 150 and a mobile server 140. Further servers may also be included, such as further recording servers, archive servers or analytics servers. A plurality of video surveillance cameras 110*a*, 110*b*, 110*c* send video data to the recording server 150. An operator client 120 is a fixed terminal which provides an interface via which an operator can view video data live from the cameras 110*a*, 110*b*, 110*c*, or recorded video data from the recording server 150.

The cameras 110*a*, 110*b*, 110*c* capture image data and send this to the recording server 150 as a plurality of video data streams.

The recording server 150 stores the video data streams captured by the video cameras 110*a*, 110*b*, 110*c*. Video data is streamed from the recording server 150 to the operator client 120 depending on which live streams or recorded streams are selected by an operator.

The mobile server 140 communicates with a user device 160 which is a mobile device such as a smartphone or tablet which has a touch screen display. The user device 160 can access the system from a browser using a web client. Via the user device 160 and the mobile server 140, a user can view recorded video data stored on the recording server 150. The user can also view a live feed via the user device 160.

Other servers may also be present in the system 100. For example, an archiving server (not illustrated) may be provided for archiving older data stored in the recording server 150 which does not need to be immediately accessible from the recording server 150, but which it is not desired to be deleted permanently. A fail-over recording server (not illustrated) may be provided in case a main recording server fails. An analytics server can also run analytics software for image analysis, for example motion or object detection, facial recognition, event detection.

The operator client 120 and the mobile server 140 are configured to communicate via a first network/bus 121 with the management server 130 and the recording server 150. The recording server 150 communicates with the cameras 110*a*, 110*b*, 110*c* via a second network/bus 122.

The video surveillance system of FIG. 6 is an example of a system in which the present disclosure can be implemented. However, other architectures are possible. For example, the system of FIG. 6 is an "on premises" system, but the present disclosure can also be implemented in a cloud based system. In a cloud based system, the cameras stream data to the cloud, and at least the recording server 150 is in the cloud. Additionally, video analytics may be carried out in the cloud. The operator client or mobile client requests the video data to be viewed by the user from the cloud.

Figure 1A:
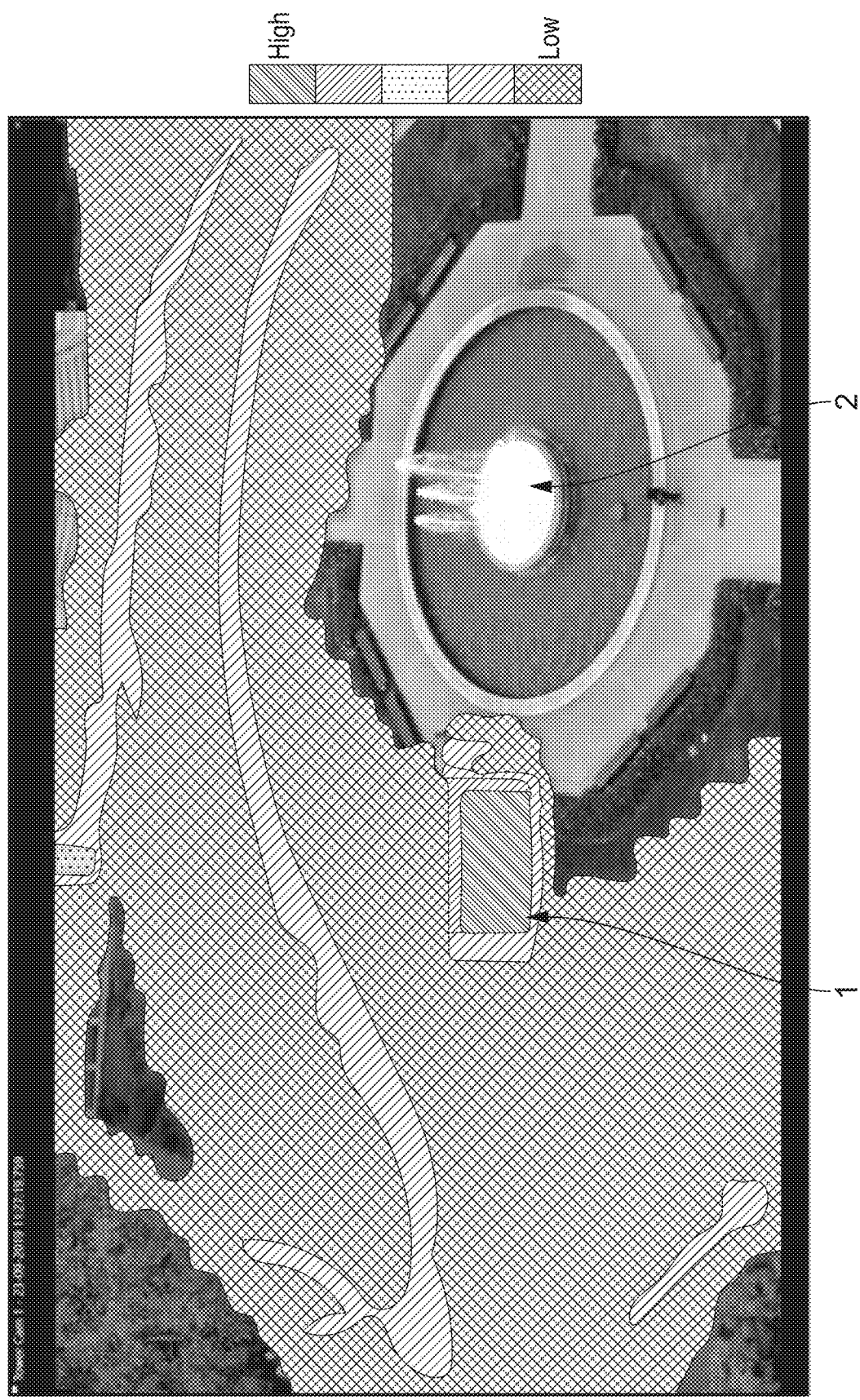
FIG. 1A shows a heatmap based on video surveillance data.
Figure 1B:
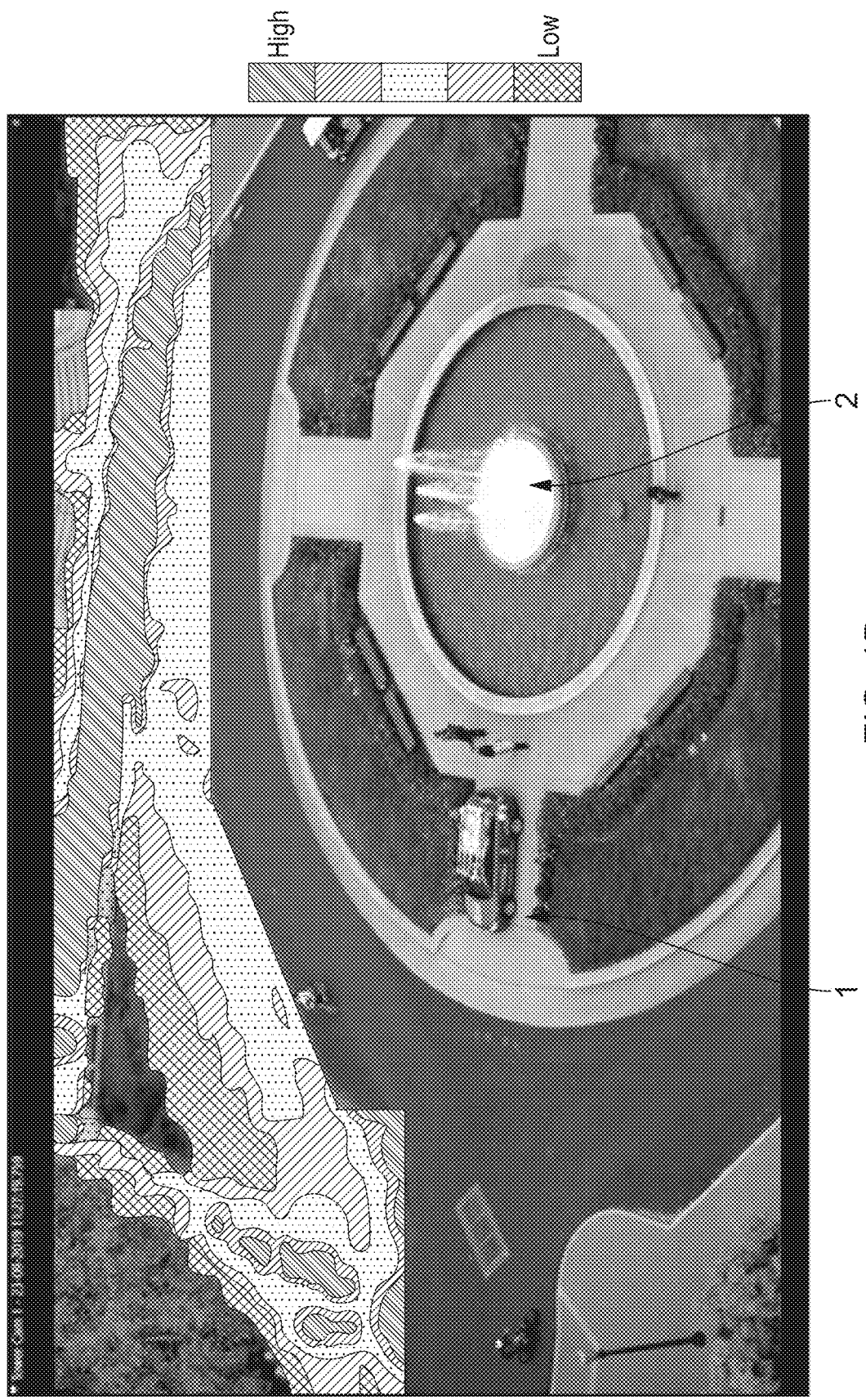
FIG. 1B shows a first recalibrated heatmap.
Figure 1C:
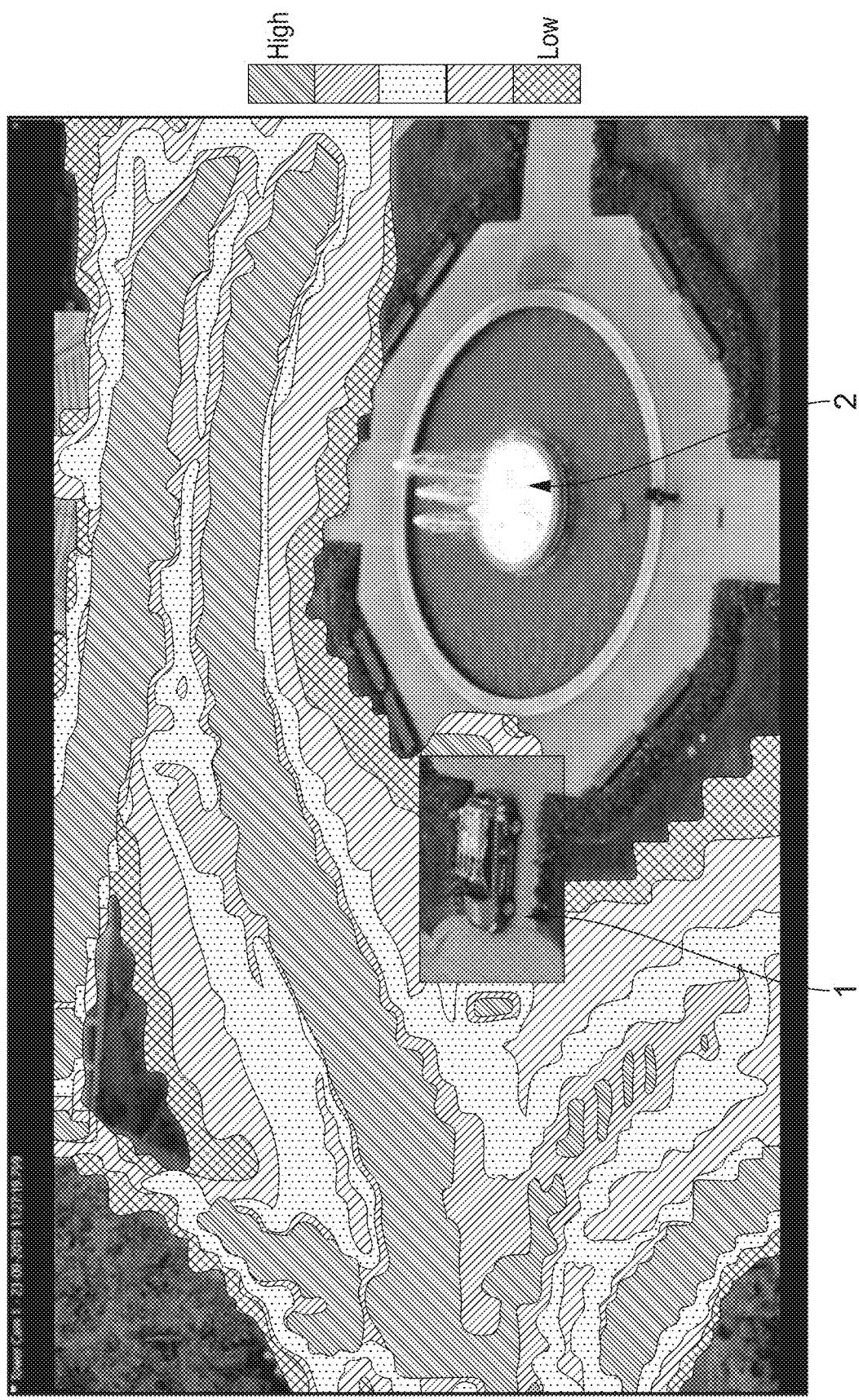
FIG. 1C shows a second recalibrated heatmap.

FIGS. 1A to 1C illustrate a method of displaying data in the form of a heatmap in accordance with an embodiment of a first aspect of the present disclosure. The heatmap is displayed on a display of an operator client 120 or mobile client 160 by a heatmap display software tool.

FIG. 1A shows a heatmap generated based on video surveillance data from a selected video surveillance camera. The heatmap is based on video data from the camera in a time period specified by the user. For example, this could be set to be the previous 2 hours, or 4 hours, or a specified time period such as 4-6 pm the previous day. The heatmap is displayed overlaid on a still image from the camera, which could be any frame from the specified time period or it could be a reference frame. Alternatively, it is possible for the heatmap to be displayed overlaid on a live video view, so that an operator can simultaneously monitor a live view whilst viewing heatmaps based on historical data. In this example, the heatmap represents object detection. Object detection/recognition has been applied to the video data by object recognition software. The object recognition software generates metadata which is associated with the video stream and defines where in a frame an object has been detected, and which may also define what type of object has been detected e.g. person, car, dog, bicycle. The heatmap shown in FIG. 1A illustrates where objects have been detected over the specified time period. The colour shading illustrates a quantitative measurement of object detection, such as the number of detections.

The object detection/recognition software, or any video analytics software that generates metadata, may be run on the operator client 120, or on an analytics server (which may be in the cloud) or may run on the camera itself. It is not essential where the metadata is generated for it to be used by the heatmap display software tool.

As can be seen in FIG. 1A, the heatmap is distorted by the presence of a parked car 1. Because the parked car 1 has been present for a significant period of time, it is repeatedly detected by the object detection and results in a very high value in the heatmap, which therefore sets the upper limit of the colour scale. This creates a "hotspot" in the heatmap, and accordingly, little detail can be seen in other areas of the heatmap.

FIG. 1B illustrates a heatmap in which a user has used an "include" tool to select the sidewalks in the upper portion of the image as an area of interest. The "include" tool allows the user to select an area of interest, and a recalibrated heatmap is then generated based only on the data in the selected area of interest.

According to the first aspect of the present disclosure, when a user selects the area of interest, a new heatmap is generated by the heatmap display software tool, based only on the selected area of interest, wherein the colour range is recalibrated based on only the video data (and its associated metadata) in the selected area of interest. One end of the colour range is set as the highest value in the selected area, and the other end is set as the lowest value. As illustrated by FIG. 1B, this recalibration allows a larger colour range to be used for the selected area and therefore more detail can be seen in the recalibrated heatmap. In the original heatmap of FIG. 1A, the heatmap in the selected area was mostly in the blue range. In the recalibrated heatmap of FIG. 1B, the full range of colours is used. An area of interest may be only one selected area, or may be made up of several separate areas of the heatmap, so a user may be able to select more than one area before entering a command to generate the recalibrated heatmap based on the data in the selected areas.

FIG. 1C illustrates a recalibrated heatmap in which a user has used an "exclude" tool to select an area of the heatmap of FIG. 1A to be excluded from the recalibrated heatmap. Therefore, the area of interest is selected by excluding at least one portion of the original heatmap. In this case, the user has selected to exclude the hotspot created by the parked car 1. As illustrated by FIG. 1C, this recalibration allows a larger colour range to be used for the remaining area and therefore more detail can be seen in the heatmap. In the original heatmap of FIG. 1A, the heatmap in the area other than the area with the parked car was mostly in the blue range. In the recalibrated heatmap of FIG. 1B, the full range of colours is used. As with the "include" tool, in the "exclude" tool, more than one area may be selected for exclusion. The user may be able to select more than one area before entering a command to generate the recalibrated heatmap.

The "include" and "exclude" tools can be used on a heatmap showing any type of data which is obtainable from video surveillance data, and the heatmap display software tool can have settings to allow a user to switch between viewing different types of heatmap. The "include" and "exclude" tools can be used in combination. For example, a user could select an area by first using the "include" tool to select a first selected area, and then use the "exclude" tool to exclude sub-areas within the first selected area.

One example of another useful type of heatmap to display might be one based on motion detection. In this case, the user may be interested in motion of people or objects. In the camera view shown in FIGS. 1A to 1C, this would be movement of people and vehicles. However, the heatmap might be undesirably distorted by motion detection of the water fountain 2 in the center of the road junction, or in very windy weather, possibly by motion of the trees or moving shadows of the trees. By viewing an initial heatmap, a user can use the "exclude" tool to remove such areas from the heatmap, and display a recalibrated heatmap based on motion only in the area of interest.

As discussed above, various video analytics software such as object recognition software can be applied to video surveillance data. These will generate metadata associated with the video stream which can indicate various types of object or activity. The video analytics software that generates metadata may be run on the operator client, even as part of the heatmap display tool, or on an analytics server (which may be in the cloud in a cloud based system) or may run on the camera itself. It is not essential where the metadata is generated for it to be used by the heatmap display software tool.

As part of the heatmap display software tool, a user may be able to select, based on the metadata, only certain types of object or activity to be displayed in heatmap form. The user can use the "include" and "exclude" tools, in combination with the metadata, to narrow down and refine a viewed heatmap.

For example, in the camera view of FIGS. 1A to 1C, if suitable object recognition has been applied to the data, the user could select to view only a heatmap of people, or cars, or bicycles.

Figure 2:
FIG. 2 shows a heatmap on a map view.

The example of FIGS. 1A to 1C is based on video data from one camera, with the heatmap displayed on an image of the field of view of the camera. However, a heatmap may also be shown on a map or plan view, as shown in FIG. 2. In this case, the video data will be data from multiple cameras, and rather than the heatmap showing where in an image the camera has detected an object or activity, it shows the location of cameras that have detected the object or activity. As in the previous example, the object or activity shown by the heatmap can be selected by a user, wherein the heatmap display software tool uses the associated metadata identifying objects and activity to generate the heatmap. A heatmap can be displayed showing vehicles or people or alerts triggered by a combination of objects and activities. For example, advanced video analytics software can detect complex events such as vehicles making illegal turns, or people behaving suspiciously (loitering behaviour). Alternatively, different detected objects or features can be combined, such as "man wearing a red baseball cap" or "man wearing a red baseball cap on a bicycle". The results can be displayed in heatmap form. As well as a map, as shown in FIG. 2, the heatmap could be displayed on a plan of an area such as a building (e.g. shopping mall or airport or stadium). The "include" and "exclude" tools described above can also be used on the heatmap on a map or plan view to recalibrate the heatmap based on a selected area of interest.

Figure 3:
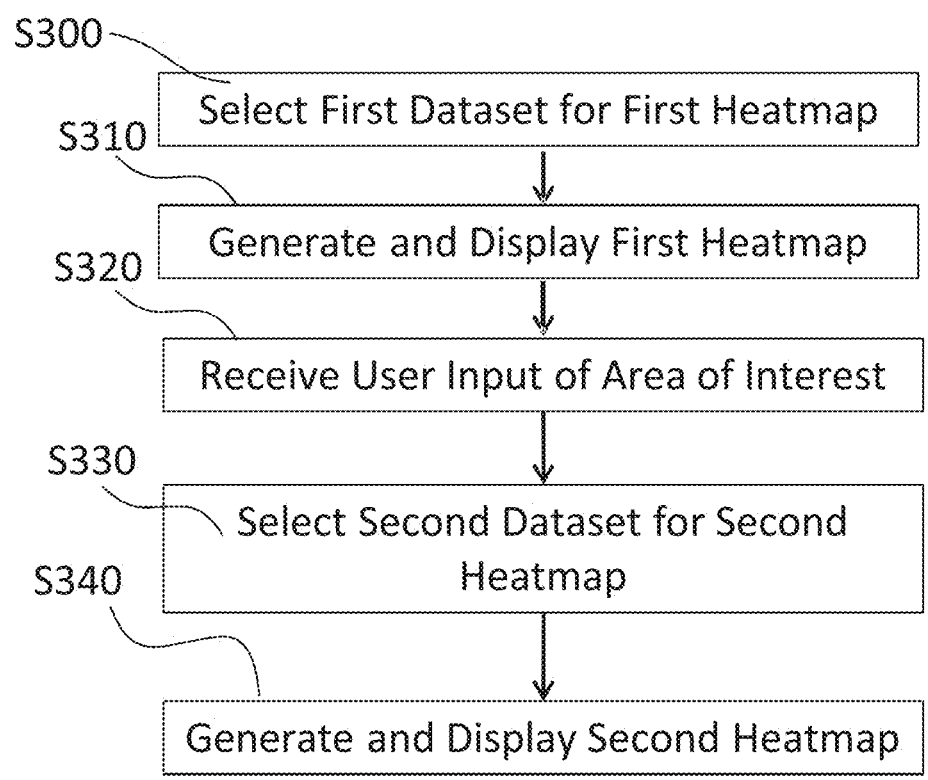
FIG. 3 is a flow chart of a method for generating and displaying a heatmap.

FIG. 3 is a flow chart of a method for generating and displaying a heatmap which is carried out by the heatmap display software tool.

In step S300, a first dataset of video surveillance data for generating a first heatmap is selected based on parameters selected by the user. The user can specify which camera they wish to use data from, and a time period. In the case of a plan view as shown in FIG. 2, the user will specify the area and the time period, and data from cameras within the area will be used. The user will additionally specify what parameter they want the heatmap to display e.g. object detection, motion etc. The user may additionally narrow down the dataset by selecting search parameters that correspond to metadata associated with the video data. The metadata has been generated by application of video analytics (e.g. object detection) to the video data. For example, the user could select to view a heatmap limited to "bicycles".

In step S310, the first heatmap is generated and displayed based on the first dataset. The heatmap can be displayed overlaid on a still image from the camera, which could be any frame from the specified time period or it could be a reference frame. Alternatively, it is possible for the heatmap to be displayed overlaid on a live video view. In the case of a plan view as shown in FIG. 2, the first heatmap may be overlaid on a map or satellite image. The first heatmap is displayed using a colour scale which is calibrated using the lowest and the highest values in the selected dataset as the lower and upper limits.

In step S320, the heatmap display software tool receives a user input selecting an area of interest of the first heatmap. The area of interest can be selected by use of the "include" or "exclude" tools as described above.

In step S330, a second dataset for a second heatmap is selected by only including data from the first dataset from the area of interest selected in step S320. The second dataset is therefore a subset of the first dataset which is limited only based on the area selected by the user.

In step S340, the second heatmap is generated and displayed. The second heatmap is displayed using a colour scale which is calibrated using the lowest and the highest values in the second dataset as the lower and upper limits. The second heatmap can be displayed overlaid on the same background as the first heatmap. Alternatively, the background can be zoomed in to display only the selected area of interest.

The selection of the area for recalibration of the heatmap by means of the "include" and "exclude" tools has been described above as being a user selection. However, it will be appreciated that the selection could also be carried out automatically, for example by a statistical tool which identifies outliers in the data and selects "hotspots" automatically. Alternatively, the selection could be an area of interest that is predetermined.

A second aspect of the disclosure will now be described.

Heatmaps are a useful tool for visualising patterns or behaviour of objects in video surveillance data. However, often a user is looking for a specific object or event. This is particularly the case in the use of video surveillance data in law enforcement. If a user is looking for specific behaviour e.g. suspicious or illegal behaviour, or is looking for a specific person e.g. a suspect or missing person, then it can be difficult and time consuming to search large amounts of video footage. Video analytics such as object and behaviour recognition discussed above can assist, and can allow a user to search for specific objects (e.g. white van or man wearing a red baseball cap), but heatmaps can be used as a tool to allow a user to quickly and intuitively hone in on relevant parts of recorded video.

According to the second aspect of the present disclosure, a user can select an area of interest in a heatmap on a display, and the system generates a search query which is sent to the recording server to extract image data from the video surveillance data that corresponds to the objects or activity represented by the heatmap in the selected area, and in the timescale to which the heatmap relates. This search query can be a metadata search query. For example, if the user is viewing a heatmap showing only cars, then the search query sent to the recording server extracts video data in the area of interest in the timescale of the heatmap, in which metadata indicates that a car has been detected.

The user may select more than one area before entering a command to generate the search query, so that the area of interest is comprised of more than one selected area.

The extracted image data is returned from the recording server to the operator client as search results. This extracted image data can then be presented to the user as search results, typically in the form of a plurality of thumbnail images, wherein the user can click on each thumbnail image to view a video clip that includes the object or activity.

The second aspect of the present disclosure can be used alone or in combination with the "include" or "exclude" tools of the first aspect.

Figure 4A:
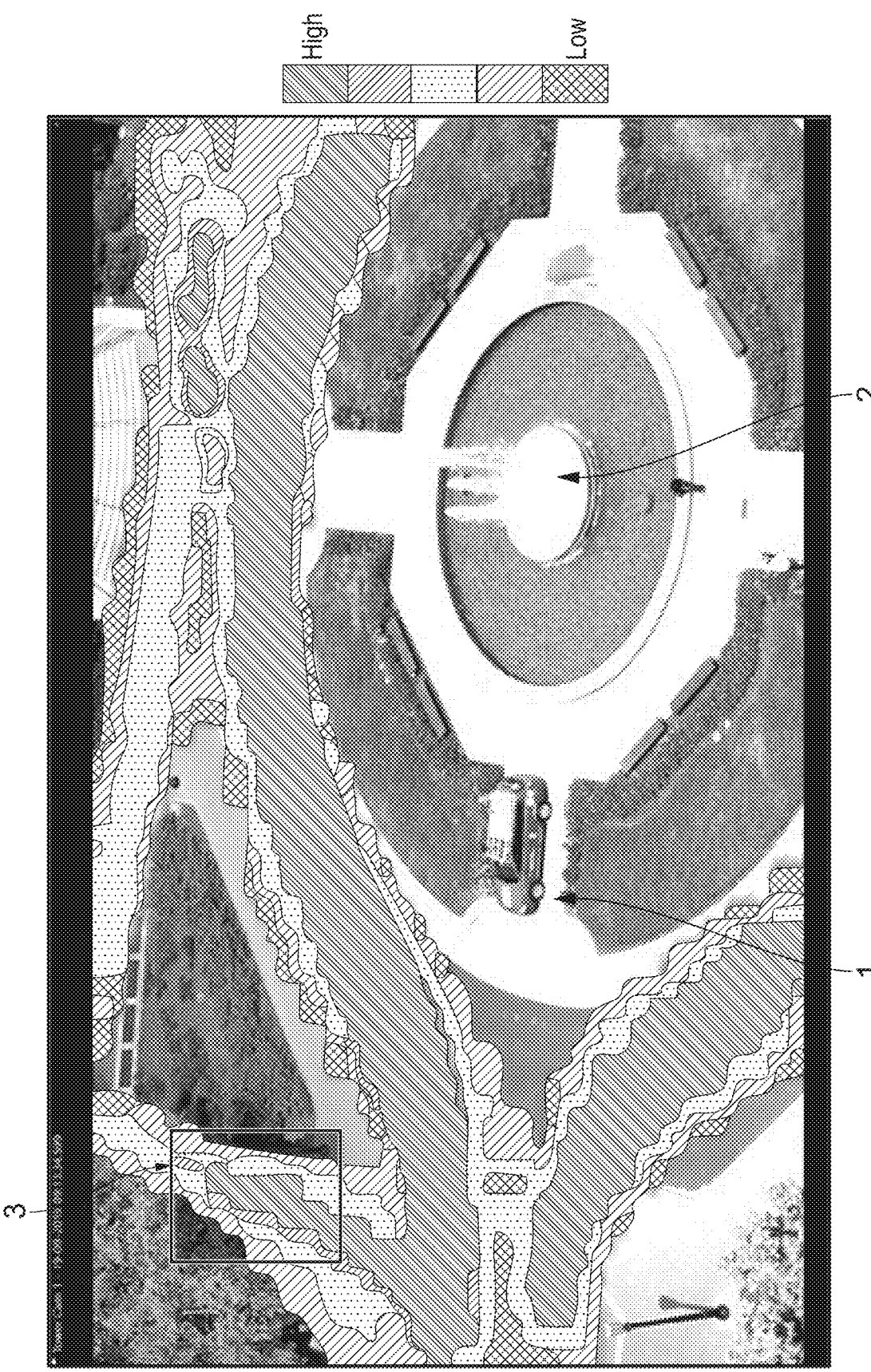
FIG. 4A illustrates selection of an area of a heatmap.

For example, FIG. 4A shows a heatmap based on motion detection, corresponding to the same scene as FIGS. 1A to 1C. The "exclude" tool has been used to exclude a hotspot caused by motion of the water fountain in the centre of the road junction. The user notices that there has been a lot of activity in the upper left corner next to the lamppost. He wants to investigate this further and selects the area 3. The system now automatically generates a search query, such as a metadata search query, that searches for motion in the video data in the selected area 3 in the time period to which the heatmap relates. The search query is executed on the system by searching the video data stored on the recording server 150, and the search results are sent to the operator client and displayed to the operator. In this case, the search query extracts a video clip and a thumbnail image for each search result. The search results are displayed to the user as thumbnail images, wherein the user can click on each thumbnail image to view its corresponding video clip.

Figure 4B:
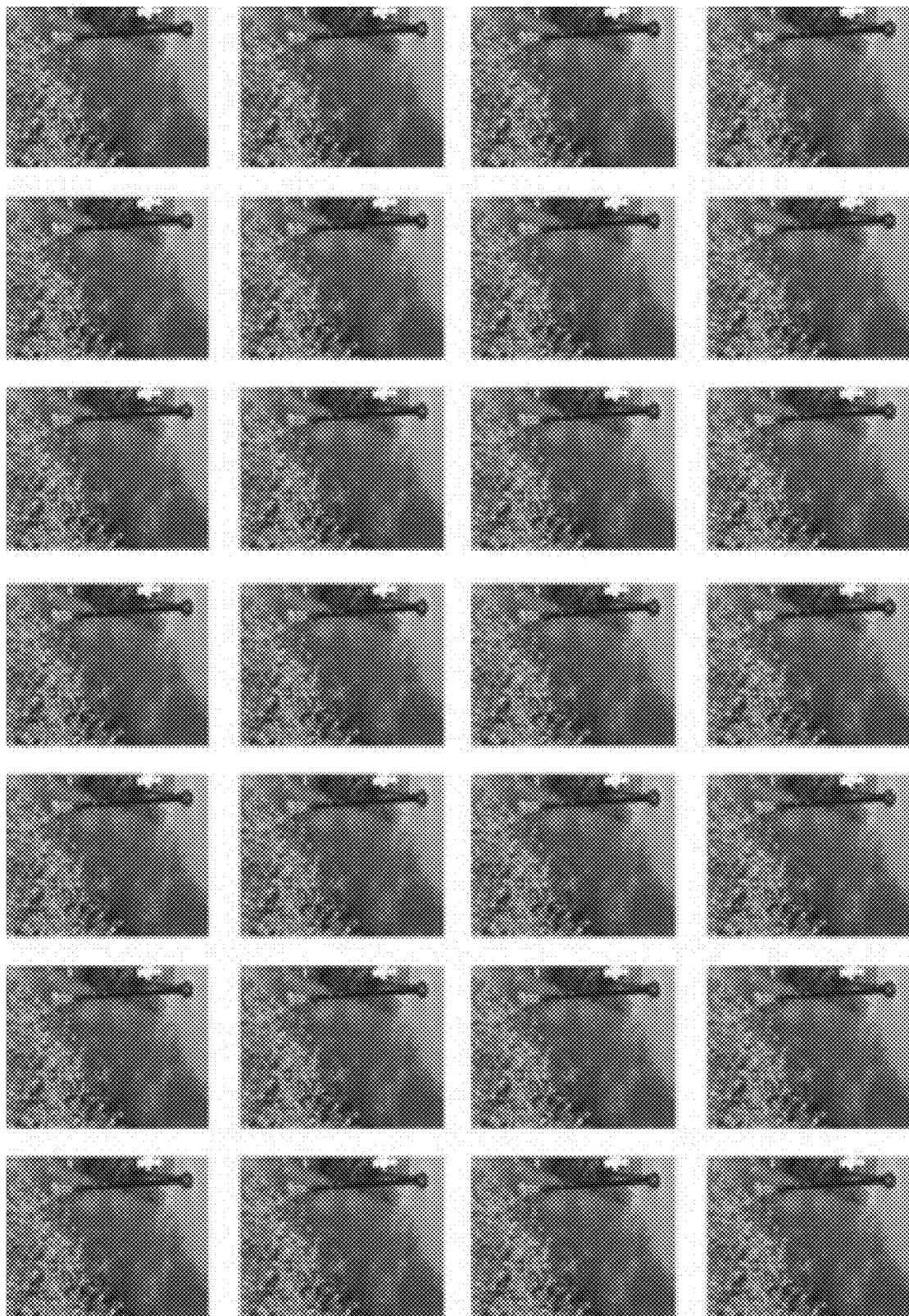
FIG. 4B illustrates search results extracted from the selection of FIG. 4A.

FIG. 4B shows the results of the search query. It can be seen in this case that there are no people or vehicles or animals in the search results, and therefore the reason for the hotspot of activity seems to be the patch of shadow which is triggering the motion detection as the leaves move in the wind or with changes in sunlight causing changes in the shadow pattern.

In a similar way, search queries can be generated from a heatmap in the form of a map or plan as shown in FIG. 2. For example, the heatmap could be a heatmap of alarms generated based on video surveillance data, wherein the alarms are set to be generated based on specific object or activity detection. The user wants a historical overview of alarms within a certain area in the last 24 hours, and if necessary, to investigate the source of these alarms. The system generates the heat map of FIG. 2. By looking on the heat map the user notices that a lot of alarms have occurred in the center of the map. He wants to investigate this further e.g. by viewing surveillance video associated with the alarms. To generate a search query he selects the area on the map. The system now automatically generates a search query, such as a metadata search query, that searches the video data for alarms from cameras in the selected area in the time period to which the heatmap relates. The search query is executed on the system and the search results showing the activities is displayed to the operator. In this case each search result is a thumbnail each representing video clip with activity.

Figure 5:
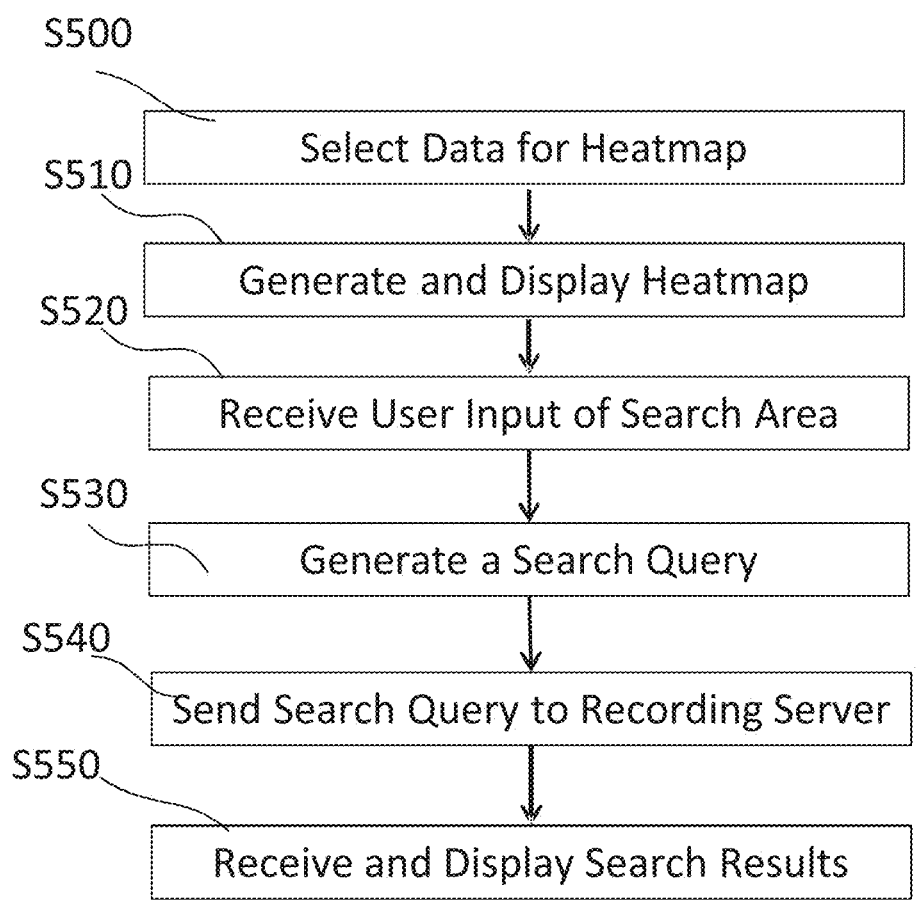
FIG. 5 is a flow chart of a method of generating a search query from a heatmap.

FIG. 5 is a flow chart of a method of generating a search query from a heatmap.

In step S500, a dataset of video surveillance data for generating a heatmap is determined based on parameters selected by the user. The user can specify which camera they wish to use data from, and a time period. In the case of a plan view as shown in FIG. 2, the user will specify the area and the time period, and data from cameras within the area will be used. The user will additionally specify what parameter they want the heatmap to display e.g. object detection, motion etc. The user may additionally narrow down the dataset by selecting search parameters that correspond to metadata associated with the video data. The metadata has been generated by application of video analytics (e.g. object detection) to the video data. For example, the user could select to view a heatmap limited to "bicycles".

In step S510, the heatmap is generated and displayed. The heatmap can be displayed overlaid on a still image from the camera, which could be any frame from the specified time period or it could be a reference frame. Alternatively, it is possible for the heatmap to be displayed overlaid on a live video view. In the case of a plan view as shown in FIG. 2, the heatmap may be overlaid on a map or satellite image.

In step S520, a user input of a search area is received.

In step S530 a search query is generated. The search query will correspond to a search for the type of object or activity that is represented by the heatmap in the time period of the heatmap, in the search area. If the heatmap has been limited to objects or activity that correspond to metadata, the search query will be a metadata search query.

In step S540, the search query is sent to a recording server. The recording server will then carry out a search of the video surveillance data based on the search query. For example, if the heatmap was displaying bicycles in the field of view of a particular camera in a 2 hour time period, then the search will be carried out on video data for the particular camera in the 2 hour time period for bicycles in the search area of the field of view.

In step S550, the results are received and displayed to the user. The results will be in the form of a plurality of video clips, each with a thumbnail image, and the thumbnails are displayed to the user such that, if the user selects a thumbnail the corresponding clip is displayed.

While the present disclosure has been described with reference to embodiments, it is to be understood that the present disclosure is not limited to the disclosed embodiments. The present disclosure can be implemented in various forms without departing from the principal features of the present disclosure as defined by the claims.

The invention claimed is:

1. A computer implemented method for displaying data in the form of a heatmap comprising:
   generating a first heatmap based on a first dataset of video surveillance data;
   displaying the first heatmap overlaid on a background image;

receiving a selection of at least one area of the first heatmap;

generating a second heatmap based on a second dataset of the video surveillance data; and displaying the second heatmap overlaid on the same background image, wherein the second dataset is a subset of the first dataset which is limited only based on the selection of the at least one area to include and/or exclude data from the selected area(s), and wherein the step of generating the second heatmap comprises recalibrating a colour range based on the second dataset.

2. The method according to claim 1, wherein the first heatmap is displayed using a first colour range calibrated based on the first dataset and the second heatmap is displayed using a second colour range calibrated based on the second dataset.

3. The method according to claim 1, wherein the video surveillance data is data from one camera the background image is an image captured by the camera which generated the video surveillance data.

4. The method according to claim 1, wherein the video surveillance data is data from a plurality of cameras, and the background image is a map or plan view.

5. The method according to claim 1, wherein the first and second heatmaps represent motion or object detection.

6. The method according to claim 1, wherein the selection of the at least one area is a user input.

7. The method according to claim 1, wherein the method further comprises receiving a selection of a search area on the first or second heatmap and extracting image data from the video surveillance data corresponding to objects or activity represented by the heatmap within the search area.

8. The method according to claim 7, wherein the extracted image data comprises at least one video clip and a thumbnail image from the or each video clip.

9. The method according to claim 8, comprising displaying the at least one thumbnail image, wherein the user can select the thumbnail image to view the corresponding video clip.

10. A non-transitory computer readable medium comprising computer readable instructions which, when run on a computer, causes the computer to carry out a method for displaying data in the form of a heatmap comprising:

generating a first heatmap based on a first dataset of video surveillance data;

displaying the first heatmap overlaid on a background image;

receiving a selection of at least one area of the first heatmap;

generating a second heatmap based on a second dataset of the video surveillance data; and displaying the second heatmap overlaid on the same background image, wherein the second dataset is a subset of the first dataset which is limited only based on the selection of the at least one area to include or exclude data from the selected area(s), and wherein the step of generating and displaying the second heatmap comprises recalibrating a colour range based on the second dataset.

11. An apparatus for displaying data in the form of a heatmap comprising:

a processor configured to:

generate a first heatmap based on a first dataset of video surveillance data;

display, on a display, the first heatmap overlaid on a background image;

receive a selection of at least one area of the first heatmap;

generate a second heatmap based on a second dataset of the video surveillance data;

display, on the display, the second heatmap overlaid on the same background image, wherein the second dataset is a subset of the first dataset which is limited only based on the selection of the at least one area to include and/or exclude data from the selected area(s), and wherein the step of generating the second heatmap comprises recalibrating a colour range based on the second dataset.

12. The apparatus according to claim 11, wherein the first heatmap is displayed using a first colour range calibrated based on the first dataset and the second heatmap is displayed using a second colour range calibrated based on the second dataset.

13. The apparatus according to claim 11, wherein the video surveillance data is data from one camera and the background image is an image captured by the camera which generated the video surveillance data.

14. The apparatus according to claim 11, wherein the video surveillance data is data from a plurality of cameras, and the background image is a map or plan view.

15. The apparatus according to claim 11, wherein the first and second heatmaps represent motion or object detection.

16. The apparatus according to claim 11, wherein the processor is configured to receive a user input of the selection of the at least one area.

17. The apparatus according to claim 11, wherein the processor is configured to receive a user selection of a search area on the first or second heatmap, wherein the processor is configured to generate a search query to extract image data from the video surveillance data corresponding to objects or activity represented by the heatmap within the search area.

18. The apparatus according to claim 17, wherein the processor is configured to receive extracted image data comprising at least one video clip and a thumbnail image from the or each video clip, and display the thumbnail image on the display.

19. The apparatus according to claim 18, wherein the processor is configured to receive a user input selecting the thumbnail image, and cause the display to display the corresponding video clip.

* * * * *